United States Patent [19]

Kawabata

[11] Patent Number: 5,629,961
[45] Date of Patent: May 13, 1997

[54] TRANSMITTER APPARATUS FOR MOBILE SATELLITE COMMUNICATION TERMINAL HAVING AN ENVELOPE EQUALIZER

[75] Inventor: Hisashi Kawabata, Tokyo, Japan

[73] Assignee: NEC Corporation, Japan

[21] Appl. No.: 360,237

[22] Filed: Dec. 20, 1994

[30] Foreign Application Priority Data

Dec. 21, 1993 [JP] Japan ................. 5-322061

[51] Int. Cl.$^6$ ................................ H04L 27/20
[52] U.S. Cl. ............... 375/308; 332/103; 375/235; 455/42
[58] Field of Search ..................... 375/308, 235, 375/230, 231, 232, 233, 234, 236, 302, 296, 297, 298, 300; 332/144, 145, 103; 455/42, 63, 110

[56] References Cited

U.S. PATENT DOCUMENTS

| | | | |
|---|---|---|---|
| 4,565,980 | 1/1986 | Ashida | 332/105 |
| 4,635,276 | 1/1987 | Karabinis | 375/235 |
| 4,706,261 | 11/1987 | Torre et al. | 375/244 |
| 4,771,438 | 9/1988 | Nash | 375/235 |
| 4,881,240 | 11/1989 | Critchlow et al. | 375/235 |
| 5,093,637 | 3/1992 | Isota et al. | 332/103 |
| 5,157,691 | 10/1992 | Ohkubo et al. | 375/232 |

FOREIGN PATENT DOCUMENTS 3-171953  7/1991  Japan .

Primary Examiner—Wellington Chin
Assistant Examiner—William Luther
Attorney, Agent, or Firm—Ostrolenk, Faber, Gerb & Soffen, LLP

[57] ABSTRACT

A transmitter apparatus for a mobile satellite communication terminal comprises a Nyquist filter having input to it two series of orthogonal data and equalizing them for a waveform, an envelope equalizer equalizing the output of the filter so that the distance of an envelope (locus) on an orthogonal axis is always constant from the origin, a phase modulator receiving the output signals from the envelope equalizer and phase-modulating them, and a power amplifier receiving the output of the phase modulator, and power-amplifying it at a high-frequency band. Thus, it becomes possible to eliminate the effects of AM-PM conversion distortion in the power amplifier.

4 Claims, 4 Drawing Sheets

TRANSMITTER APPARATUS FOR MOBILE SATELLITE COMMUNICATION TERMINAL HAVING AN ENVELOPE EQUALIZER

BACKGROUND OF THE INVENTION

1. Field of the Invention

The present invention relates to a transmitter which amplifies phase-modulated signals with a high-frequency power amplifier, and transmits them, and, more particularly, to a transmitter in which AM/PM conversion distortion in the transmission power of a mobile satellite communication terminal is reduced.

2. Description of the Prior Art

FIG. 1 is a block diagram showing the configuration of a conventional transmitter. In the figure, input data for the transmitter is two series of transmission data signals $D_I$ and $D_Q$ consisting of an in-phase channel (I channel) and a quadrature channel (Q channel) which are orthogonal binary baseband signals. This data is called an NRZ signal.

In addition, such a transmitter comprises a Nyquist filter 11 for eliminating harmonic components in the baseband, a four-phase modulator 13 receiving the output from the Nyquist filter 11 as its input and outputting four-phase modulated signals, and a power amplifier 14 for frequency-converting the modulated signals (QPSK signals) from the four-phase modulator to high-frequency signals in the microwave band, and transmitting high-power signals in the microwave band. Such configuration is described in, for example, Japanese Published Unexamined Patent Application No. 3-171953, by Minori Kouno.

Generally, QPSK signals not bandwidth-limited have a constant envelope for modulated signals, and, therefore, are not affected by the nonlinearity of the transmission path (for example, AM-AM conversion or AM-PM conversion where AM means amplitude modulation and PM means phase modulation).

However, bandwidth-limited QPSK signals are widened for their spectrum by the nonlinear amplification of a power amplifier and affected by AM-PM conversion and the like so that the code error rate characteristics are deteriorated. Therefore, if it is desired that these not be affected by the nonlinear amplification of the power amplifier and the like, the modulation characteristics of the envelope must be maintained as constant as possible. The above operations are fully described in "TDMA Communication," S. Kato et al., IECE Japan (1989), pages 61–76. The impact of such nonlinearity of the power amplifier is described for the configuration in FIG. 1.

In the transmitter in FIG. 1, the output of the four-phase modulator 13 is usually bandwidth-limited by using a bandwidth filter to prevent unnecessary spurious noise in the radio frequency range and interference with adjacent signals.

The bandwidth-limited modulated signals are input to a high-frequency power amplifier 14. Because the power amplifier 14 used in the transmitter of a mobile satellite communication terminal is particularly required to consume minimum power, it is desirable that it be as much in the nonlinear amplification region of input/output characteristics as possible. If it is to be used in the nonlinear region of input/output characteristics, however, AM-PM conversion distortion is generated along with changes in the amplitude at each phase of the output signal from the four-phase modulator 13, which, in turn, generates phase error in the transmission signals so that phase error in the transmission signals is increased.

The transmission signals with such phase error are transmitted to another earth station via a satellite. In a case where the above-mentioned modulated signals are decoded into two series of data signals of the orthogonal I and Q channels by a decoder at the receiving side, decoding directly causes demodulation errors in the output of an orthogonal detector to cause a degradation in the error rate. For example, when a class B or C high-frequency FET amplifier is used as the power amplifier 14 and operated near the saturation point, the AM-PM conversion characteristics would be as high a value as 8–12 deg/dB.

As a result, the AM-PM conversion distortion generated in the output of the transmitter causes a phase error in the output of the modulator at the receiving side so that the value of Eb/No in the Eb/No to bit error rate characteristics would be lowered by about 0.3 dB when compared with theoretical non distortion. Here, Eb/No is the ratio of the noise power density in the input of the receiver (W/Hz) to the power per bit in the input of the receiver (W).

The lowering of Eb/No causes serious problems such as a need to review the circuit design or change the antenna size as in the case of satellite communication where the operation should be performed at a low Eb/No as possible so as to transmit as much information.

BRIEF SUMMARY OF THE INVENTION

Object of the Invention

The object of the present invention is to eliminates the above problems, and to provide a transmitter apparatus for mobile satellite communication terminals which can perform transmission without being adversely affected by AM-PM conversion deformation even when a power amplifier in a nonlinear region is used.

Summary of the Invention

To this end, the present invention provides an envelope equalizer before a four-phase modulator, which envelope equalizer receives the outputs of a two-series Nyquist filter as its input, and makes constant the envelope on an orthogonal axis of the output of the Nyquist filer. The output of the envelope equalizer is input to the four-phase modulator. In this case, because the amplitude of the phase modulator output can be made constant, it is possible to eliminate the effects of AM-PM conversion distortion from a high-power amplifier so that the phase error can be reduced.

BRIEF DESCRIPTION OF THE DRAWINGS

The present invention will be further described in detail with reference to the accompanying drawings, in which.

DETAILED DESCRIPTION OF THE PREFERRED EMBODIMENTS

Figure 1:
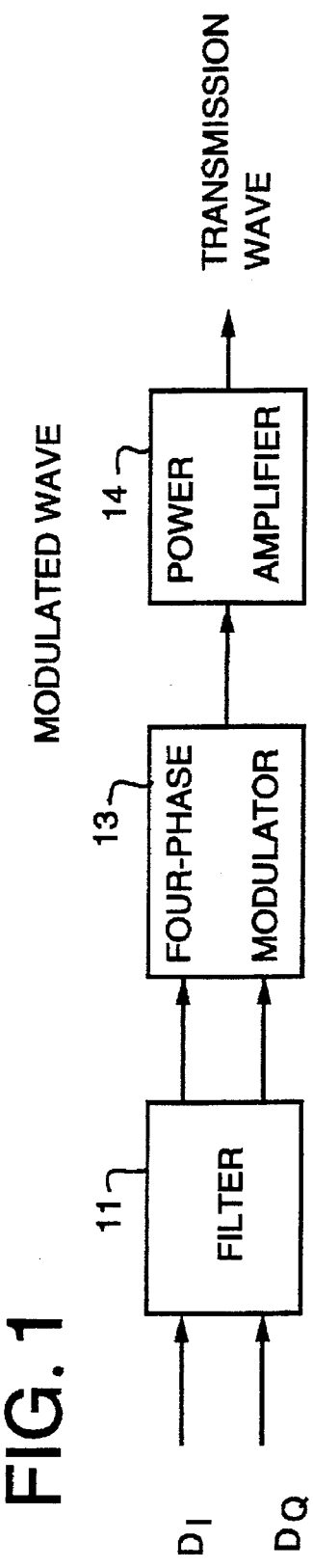
FIG. 1 is a block diagram of a prior-art transmitter apparatus for mobile satellite communication terminal.
Figure 2:
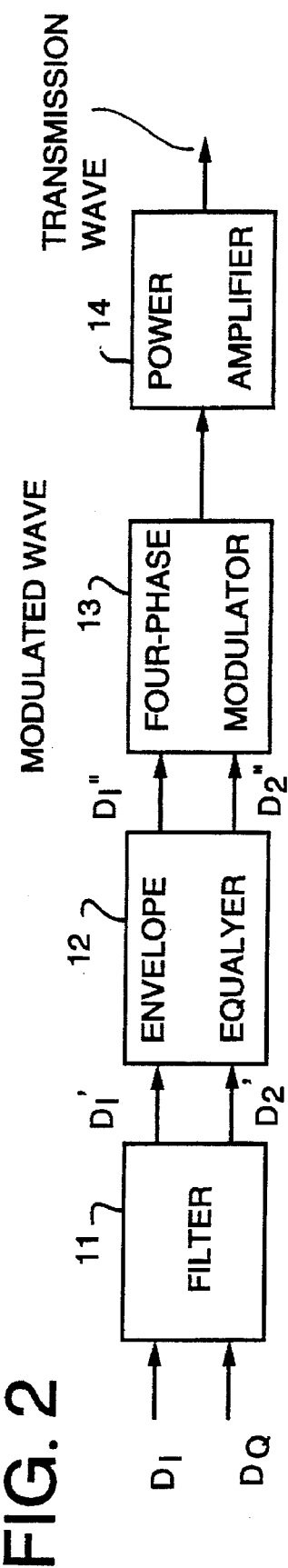
FIG. 2 is a block diagram of a first embodiment of the present invention.

FIG. 2 shows a functional block diagram of a transmitter apparatus for a mobile satellite communication terminal used in the present invention. In the figure, a Nyquist filter 11, a four-phase modulator 13, and a power amplifier 14 have configurations similar to those shown in FIG. 1, and therefore their description is omitted here.

In the figure, the difference from the configuration of FIG. 1 lies in that the envelope equalizer 12 is provided between the Nyquist filter 11 and the four-phase modulator 13. In the figure, two series of transmission data orthogonal signals $D_I$ and $D_Q$ are input to the Nyquist filter 11, and coded, respectively. The output of the Nyquist filter 11 is then input to the envelope equalizer 12, and then to the power amplifier 14 after the amplitude of each signal is made constant. That is, the envelope equalizer 12 has the function of receiving, as its input, two series of data signals $D_I'$ and $D_Q'$ which are equalized for the waveform in the Nyquist filter 11, and the function of converting them to two series of data signals $D_I''$ and $D_Q''$ with a constant amplitude at each phase.

Figure 3:
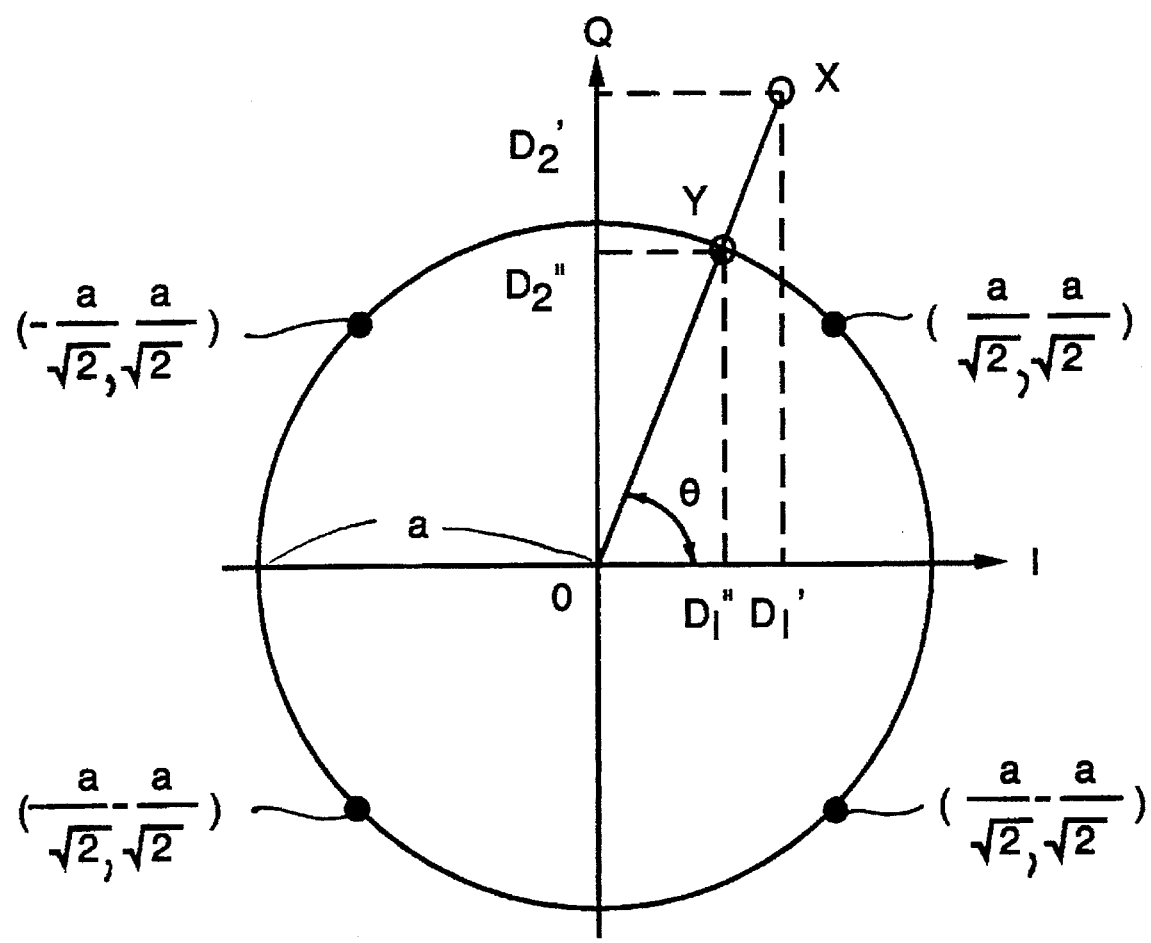
FIG. 3 is a diagram showing a waveform for each phase point in the configuration shown in FIG. 2 on an orthogonal axis.

Here, FIG. 3 is a diagram representing the phase states of four points in orthogonal four-phase modulated waves for the two series of data I and Q on a phase plane. The envelope equalizer has the function of equalizing the signals so that the locus (envelope) of each phase point to the phase change constructs a circular locus with a constant distance to the origin (the value of "a" in the figure).

Figure 4:
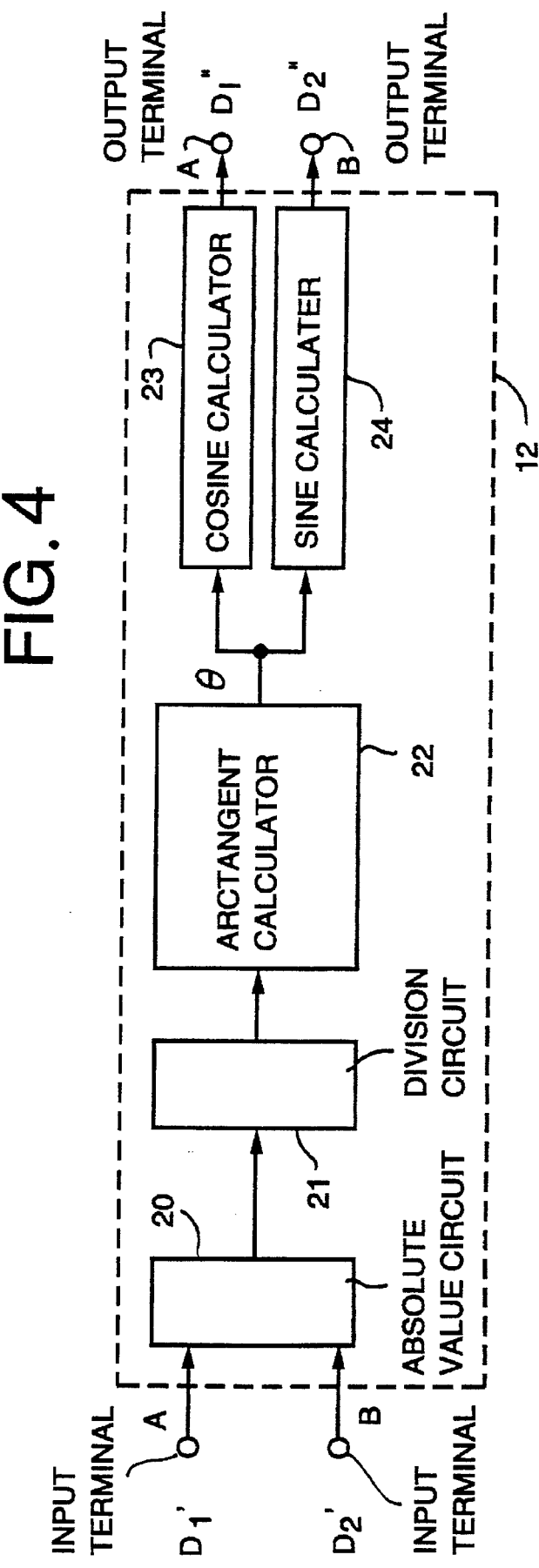
FIG. 4 is a block diagram of a first embodiment of the envelope equalizer 12 of the present invention.

FIG. 4 shows an example of a detailed configuration of the envelope equalizer 12. In the figure, input terminals A and B are used to input orthogonal data $D_I'$ and $D_Q'$, respectively. A phase point in the first quadrant in this case is indicated as X in FIG. 3. In this case, it is on a locus different from the circular locus. The equalizer determines absolute values $|D_I'|$ and $|D_Q'|$ of orthogonal data $D_I'$ and $D_Q'$ with an absolute value circuit 20. Each value is input to a division circuit 21 to conduct the division of $|D_I'|/|D_Q'|$.

Thus, a value $$D=|D_I'|/|D_Q'| \tag{1}$$

is generated at the output of the division circuit 21.

The output of the division circuit 21 is then input to an arc-tangent calculator 22 to determine phase angle $\theta$ between data $D_I'$ and data $D_Q'$ from the following relationship expression based on the value of division D determined by the division circuit 21:

$$\theta=\tan^{-1}D=\tan^{-1}(|D_I'|/|D_Q'|) \tag{2}$$

The output of the arc-tangent calculator 22 is input to a cosine calculator 23 and a sine calculator 24.

Since the distance a from the origin is known in FIG. 3, the cosine calculator 23 conducts the following calculation by using phase angle $\theta$ to construct a constant locus, and obtains output data $D_I''$.

$$D_I''=a\times\cos\theta \tag{3}$$

Similarly, the sine calculator 24 conducts the following calculation to construct a constant locus.

$$D_Q''=a\times\sin\theta \tag{4}$$

Thus, the output of the envelop equalizer 12 is converted to the data of phase point Y in FIG. 3.

Thus, data Y can be used to construct a circular locus with constant distance a from the origin.

Although the cosine calculator 23 and the sine calculator 24 multiply distance a from the origin in the equations (3) and (4), the multiplication may be eliminated by prior normalization.

Figure 5:
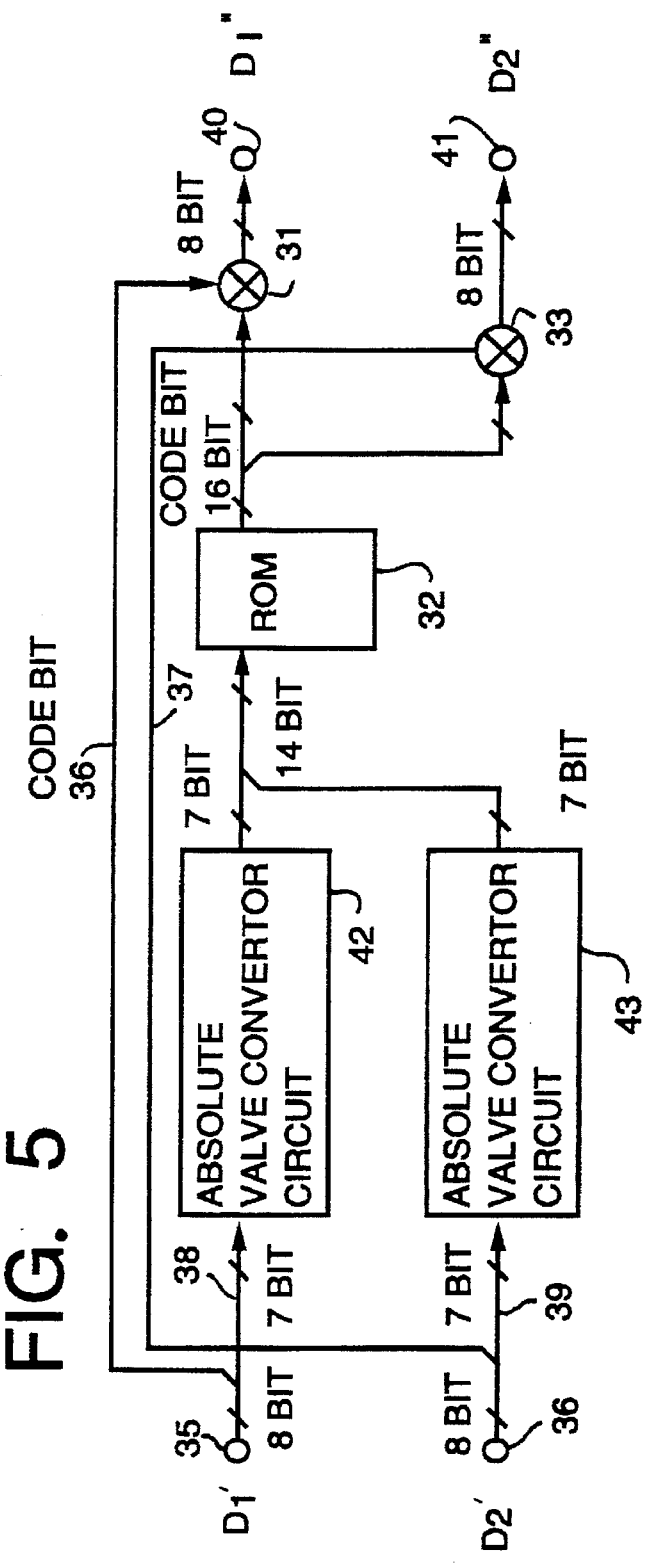
FIG. 5 is a diagram showing a detailed configuration of the envelope equalizer 12 shown in FIG. 4.

FIG. 5 shows a detailed configuration of the envelope equalizer 12.

In the figure, two-series of orthogonal data $D_I'$ and $D_Q'$ are input to input terminals 34 and 35. In the figure, they are assumed respectively to be, for example, parallel 8-bit data signals. These data signals are divided into 1-bit code bits 36 and 37, and 7-bit information bits 38 and 39.

The 7-bit information bits 38 and 39 are input to the absolute value converter circuits 42 and 43, respectively, to calculate absolute values $|D_I'|$ and $|D_Q'|$. The output signals of the absolute value converter circuit 42 and 43 are combined and input to a ROM (Read Only Memory) 32 as a 14-bit signal.

The ROM 32 outputs the following values as data providing the circular locus previously stored by using the absolute values $|D_I'|$ and $|D_Q'|$ determined by the absolute value convertor circuits 42 and 43 as addresses (14 bits).

$$|\cos(\tan^{-1}(|D_I'|/|D_Q'|))| \tag{5}$$

$$|\sin(\tan^{-1}(|D_I'|/|D_Q'|))| \tag{6}$$

If the output of the ROM 32 is assumed here to be 16-bit data, the ROM may be sufficiently implemented with a capacity of as much as 256 kbits because the data is 16-bit for the input address of 14 bits.

After the output data of the ROM 32 is divided into the cosine output and the sine output, these are multiplied with the code bit 36 and 37, respectively, by the multiplier circuit 31 and 33. Thus, orthogonal data $D_I''$ and $D_Q''$ with a constant distance from the origin of the envelope can be obtained.

Figure 6:
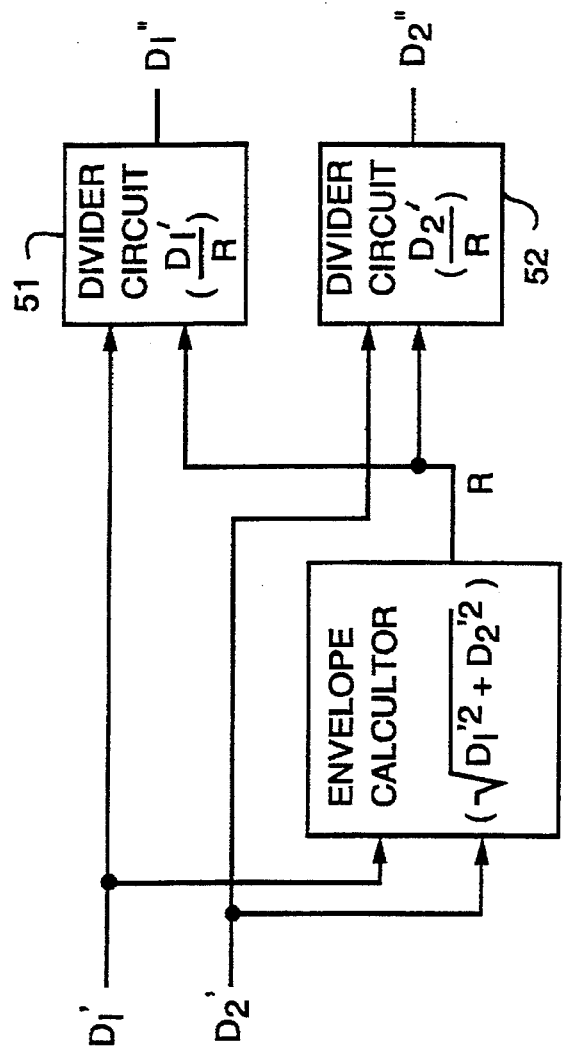
FIG. 6 is a block diagram of a second embodiment of the envelope equalizer 12 of the present invention.

Next, another embodiment of the envelope equalizer 12 will be described by referring to FIG. 6.

Two-series data outputs $D_I'$ and $D_Q'$ of the Nyquist filter 11 are input to an envelope calculator 53. The envelope calculator 53 determines a distance R from the origin according to the following equation:

$$R=\sqrt{D_I^2+D_Q^2} \tag{7}$$

The output R of the envelope calculator 53 is input to divider circuits 51 and 52. Divider circuits 51 and 52 also receive two-series data $D_I'$ and $D_Q'$, respectively, and conduct the following division operation to determine $D_I''$ and $D_Q''$:

$$D_I''=D_I'/R \tag{8}$$

$$D_Q''=D_Q'/R \tag{9}$$

Thus, it is possible to obtain orthogonal data signals $D_I''$ and $D_Q''$ providing a locus with a constant distance from the origin.

Although the embodiment described above is described for a configuration using a four-phase modulator, it is a matter of course that the embodiment can be applied to other orthogonal phase modulation types.

Figure 7:
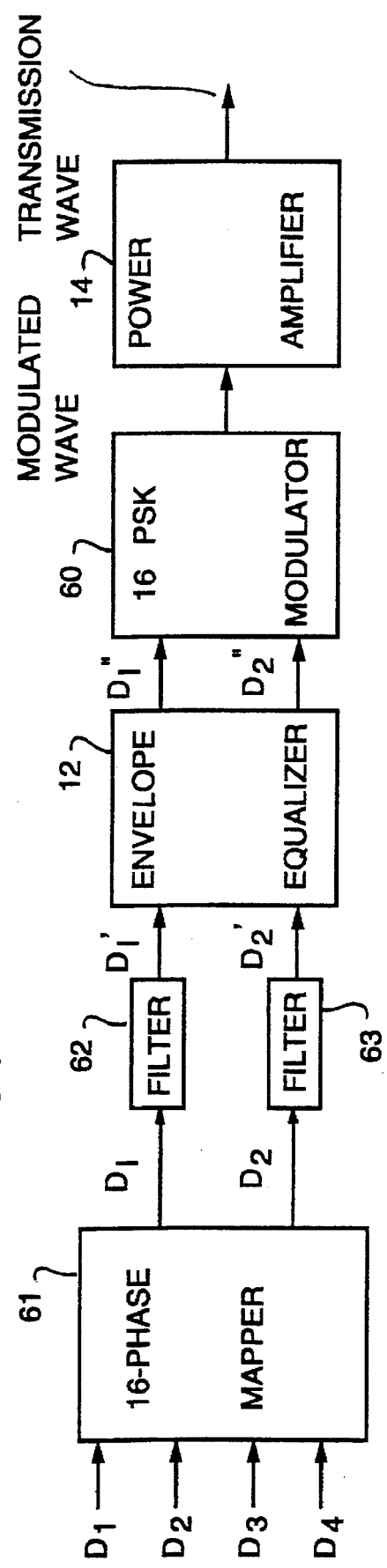
FIG. 7 is the second embodiment when the phase modulator of the present invention is applied to a 16-phase modulator.

For example, FIG. 7 is a configuration in which the present invention is applied to 16-phase modulation (16 PSK).

The reference 61 denotes a 16-phase mapper for dividing input digital signals $D_1$–$D_4$ into orthogonal two components $D_I'$ and $D_Q'$. The references 62 and 63 denote Nyquist filters which eliminate high-frequency components from components $D_I'$ and $D_Q'$ divided by the 16-phase mapper. The outputs of the Nyquist filters 62 and 63 are input to an envelope equalizer 12 where the outputs are equalized to make the distance from the origin constant and to obtain data $D_I''$ and $D_Q''$. Then, this data is input to a 16 PSK modulator 60, and amplified by a power amplifier 14 to provide high-frequency signals for transmission.

As described above, in the transmitter apparatus for mobile satellite communication terminals of the present invention, the amplitude of orthogonal phase modulator output is made constant at every data symbols so that the transmitter apparatus is not affected by the AM-PM conversion distortion of a high-frequency power amplifier even if it is high, and, therefore, the phase error can be reduced.

When the transmitter apparatus according to the present invention is used, even a class C high-frequency amplifier used in the nonlinear region can be prevented from increasing intercode interference by performing waveform equalization for the amplitude component in a transmission filter output with a simple envelope equalizer, and can operate in a region with less backoff so that the small size and low power consumption necessary for a transmitter apparatus for mobile satellite communication terminal can be advantageously attained.

What is claimed is:

1. A transmitter apparatus for a mobile satellite communication terminal, comprising:

a Nyquist filter receiving two series of orthogonal data (in-phase data and quadrature-phase data) for eliminating high-frequency components from said two series of orthogonal data;

an envelope equalizer for equalizing an amplitude of an output of said Nyquist filter such that an envelope of each phase point to the phase change provides a circular locus with a constant distance to an origin;

an orthogonal phase modulator for orthogonal phase-modulating output signals from said envelope equalizer; and a high-power amplifier receiving output signals from said orthogonal phase modulator for converting the output signals from said orthogonal phase modulator to RF signals and transmitting said RF signals at a high power.

2. A transmitter apparatus claimed in claim 1, wherein said envelope equalizer comprises:

an absolute value circuit receiving said two series of orthogonal data from said Nyquist filter, for determining absolute values for said two series of orthogonal data;

a division circuit for dividing said absolute values from said absolute value circuit;

an arc-tangent calculator receiving outputs of said division circuit, and for calculating arc-tangents for outputs of said division circuit to determine a phase angle of said outputs;

a cosine calculator for determining the cosine value of said phase angle; and a sine calculator for determining a sine value of said phase angle, thereby obtaining two series of data signals in which the output data from said cosine calculator and said sine calculator are orthogonal to each other.

3. A transmitter apparatus for a mobile satellite communication terminal, comprising:

a Nyquist filter receiving two series of orthogonal data, for eliminating high-frequency components from said two series of orthogonal data;

an envelope equalizer for equalizing an amplitude of an output of said Nyquist filter such that an envelope of each phase point to the phase change provides a circular locus with a constant distance to an origin;

a phase modulator for phase-modulating output signals from said envelope equalizer;

a high-power amplifier receiving the output signals from said orthogonal phase modulator, for converting the output signals from said orthogonal phase modulator to high-frequency signals and transmitting said high frequency signals at a high power;

wherein said envelope equalizer comprises:

an absolute value circuit receiving said two series of orthogonal data from said Nyquist filter, for determining absolute values for said two series of orthogonal data, said absolute value circuit having first and second absolute value converter circuits each receiving information data from orthogonal data of outputs of said Nyquist filter, for calculating absolute value of said information data;

a division circuit for dividing said absolute values from said absolute value circuit;

an arc-tangent calculator for receiving outputs of said division circuit, and for calculating arc-tangents for outputs of said division circuit to determine a phase angle of the two series filter outputs;

a cosine calculator for determining the cosine value of said phase angle; and a sine calculator for determining a sine value of said phase angle, thereby obtaining two series of data signals in which the output data from said cosine calculator and said sine calculator are orthogonal to each other;

a ROM (Read Only Memory) receiving a combined data of output signals from said first and second absolute value converter circuits, for being read for a sine value and a cosine value, which values are previously stored with combined data as an address; and a multiplier circuit dividing the output data from said ROM into two series of information data and multiplying each of said information data with code bits of signals from said first and second absolute value converters.

4. A transmitter apparatus for a mobile satellite communication terminal, comprising:

a Nyquist filter receiving two series of orthogonal data, for eliminating high-frequency components from said two series of orthogonal data;

an envelope equalizer for equalizing an amplitude of an output of said Nyquist filter such that an envelope of each phase point to the phase change provides a circular locus with a constant distance to an origin;

a phase modulator for phase-modulating output signals from said envelope equalizer;

a high-power amplifier receiving the output signals from said orthogonal phase modulator, for converting the output signals from said orthogonal phase modulator to high-frequency signals and transmitting said high frequency signals at a high power;

wherein said envelope equalizer comprises:

an absolute value circuit receiving said two series of orthogonal data from said Nyquist filter, for determining absolute values for said two series of orthogonal data;

a division circuit for dividing said absolute values from said absolute value circuit;

an arc-tangent calculator for receiving outputs of said division circuit, and for calculating arc-tangents for outputs of said division circuit to determine a phase angle of the two series filter outputs;

a cosine calculator for determining the cosine value of said phase angle; and a sine calculator for determining a sine value of said phase angle, thereby obtaining two series of data signals in which the output data from said cosine calculator and said sine calculator are orthogonal to each other;

an envelope calculator receiving said two-series of the orthogonal data of said Nyquist filter output and obtaining a root mean square for each of them; and a divider circuit for dividing each of said two-series data of the output signal from said envelope calculator, thereby for outputting two series of orthogonal data signals which are equalized for the envelope with the output of said divider circuit.

* * * * *